United States Patent [19]
Johnson

[11] Patent Number: 5,597,629
[45] Date of Patent: Jan. 28, 1997

[54] HIGH SHEAR STRENGTH PULTRUSION

[75] Inventor: David W. Johnson, San Diego, Calif.

[73] Assignee: Ebert Composites Corporation, San Diego, Calif.

[21] Appl. No.: 325,981

[22] Filed: Jan. 26, 1995

Related U.S. Application Data

[63] Continuation-in-part of Ser. No. 128,800, Sep. 28, 1993, abandoned, and Ser. No. 196,650, Feb. 14, 1994, and Ser. No. 259,431, Jun. 14, 1994, which is a continuation-in-part of Ser. No. 715,912, Jun. 14, 1991, Pat. No. 5,247,774, and Ser. No. 541,547, Jun. 21, 1990, Pat. No. 5,024,036, and Ser. No. 231,379, Aug. 12, 1988, Pat. No. 4,991,726, which is a continuation-in-part of Ser. No. 137,101, Dec. 23, 1987, Pat. No. 4,809,146, and Ser. No. 137,100, Dec. 23, 1987, Pat. No. 4,825,620, and Ser. No. 848,573, Apr. 7, 1986, Pat. No. 4,715,503.

[51] Int. Cl.$^6$ ............................................. B29D 22/00
[52] U.S. Cl. ........................ 428/36.1; 428/102; 428/152; 428/176; 428/181; 428/193
[58] Field of Search ............................... 428/102, 130, 428/176, 193, 246, 152, 181, 297, 298, 293, 294, 229, 36.1, 251

[56] References Cited

U.S. PATENT DOCUMENTS

| | | | |
|---|---|---|---|
| 4,564,540 | 1/1986 | Davies et al. | 428/34 |
| 5,055,242 | 10/1991 | Vane | 264/22 |
| 5,303,916 | 4/1994 | Rodgers | 273/67 A |

*Primary Examiner*—James J. Bell

[57] ABSTRACT

To produce a pultrusion which can be machined without undue strength loss bidirectional woven fiber fabric is modified to be pultrudable into a high shear strength composite member. In a preferred form of the invention the fabric is pleated in the pultrusion process to create an endless wall of stacked switchback pleated layers which defines a box beam wall in one example, and the shaft of a bolt in another. Products produced by this process have improved isotonic strength qualities over currently produced pultrusions, which are limited to unidirectional fibers, continuous fiber mats, or alternating layers of non-woven 0° and 90° cloth and do not have the shear strength inherent in the pleated configuration.

15 Claims, 4 Drawing Sheets

HIGH SHEAR STRENGTH PULTRUSION

BACKGROUND

This disclosure is a Continuation-in-part of the following three U.S. patent applications:

1. TAPERED COMPOSITE ELEVATED SUPPORT STRUCTURE, invented by David W. Johnson, filed Sep. 28, 1993 under Ser. No. 08/128,800 now abandoned;
2. IMPROVED INTERLOCKING COMPOSITE STRUCTURE, filed Feb. 14, 1994 under Ser. No. 08/196,650 pending by inventors W. BRANDT GOLDSWORTHY, DAVID W. JOHNSON AND GEORGE KORZENIOWSKI; and,
3. HEAVY CONSTRUCTION SYSTEM USING PULTRUDED COMPONENTS, invented by W. BRANDT GOLDSWORTHY, DAVID W. JOHNSON AND GEORGE KORZENIOWSKI, and filed Jun. 14, 1994 under Ser. No. 08/259,431 pending. Those disclosures were Continuations-in-part of the following: U.S. patent application Ser. No. 715,912 filed Jun. 14, 1991, issuing Sep. 28, 1993, as U.S. Pat. No. 5,247,774 on a TOWER CONSTRUCTED OF PULTRUDED COMPOSITES; Ser. No. 541,547, filed Jun. 21, 1990, U.S. Pat. No. 5,024,036 issued on Jun. 18, 1991 on an invention entitled INTERLOCKING SUPPORT STRUCTURES; Ser. No. 231,379, filed Aug. 12, 1988 U.S. Pat. No. 4,991,726 issued Feb. 12, 1991 on an invention entitled SUPPORT STAND, that was a Continuation-in-Part of both: Ser. No. 137,101, filed Dec. 23, 1987, U.S. Pat. No. 4,809,146 issued Feb. 28, 1989 on ENCLOSURE WITH INTERLOCKING FRAME JOINTS and Ser. No. 137,100, filed Dec. 23, 1987, now U.S. Pat. No. 4,825,620, issued May 2, 1989 on a STRUCTURAL SUPPORT OF INTERLOCKING LATTICE CONSTRUCTION, both of which were Continuations-in-part of Ser. No. 848,573, filed Apr. 7, 1986, now U.S. Pat. No. 4,715,503 issued Dec. 29, 1987 on an INTERLOCKING JOINT WINE RACK.

Composite construction, which only a few years ago was limited to surf boards and a few speciality items, is now a rapidly expanding technology. Composites, which constitute a fiber array set in a resin matrix, have advantages in many specific applications requiring reduced weight, reduced cost, or chemical, biological, or electrical properties not present in alternative materials such as steel. Nonetheless the widest application of composite construction remains hand lay-ups for boats, surfboards and the like. Production products, as opposed to hand lay-up items, tend to be simply shaped items such as tool handles, highway delineators and ladders, whose designs are not overly confined by constraints of an unchanging cross section inherent in the pultrusion process, used to make most manufactured composite products.

The current line of inventions as disclosed in the patents and applications referenced above expands the inventory of techniques used in dealing with composites, addressing particularly those characteristics that have impeded the use of composites as structural members in heavy construction. With those improvements, and those of the instant invention, pultruded composites are integratable into large structures such as bridges, towers, and decks, wherein their qualities can advantageously be used in place of more conventional wood or steel members.

The most significant obstacle to development of composite structural members has been the difficulty in creating strong joints between members. The flexibility of joint formation inherent in steel construction, enabling the torching of bolt holes on the fly and welding one member to another in the field without no significant loss of strength to the members, may never be fully realized in composites, as there is no satisfactory welding process and bolt holes debilitate the composite member by a factor much greater than the pro-rata strength loss attributable to the removal of the bored material. Nonetheless innovative joint designs have been shown to enable the creation of very strong large structures with composites alone, using no other structural members. The techniques in the referenced disclosures avoid boring bolt holes in the members by configuring the members to interlock at the joints.

Much recent effort on the part of the inventors has gone into the creation of a full-sized prototype high voltage transmission tower made exclusively with pultruded composites. This tower stands as a testimonial to the fact that innovative joint design can overcome the problems heretofore experienced when trying to join composite members as though they were steel. The transmission tower has four arched legs extending the entire height of the tower, and which continuously change in compound angular orientation to the horizontal progressing from bottom to top, while at the same time converging. The cross braces experience a different compound angle at their juncture with the support legs at each level and span between increasingly closely spaced leg members, all of which creates an angle milling schedule that would be virtually unworkable prior to computer controlled machining. All of these joints were made without any steel, and without boring bolt holes in the members by using interlocking joints. The resulting tower passed rigid industry endurance tests, and field assembly time was improved over the known assembly time for a comparable steel tower.

The joint problem with composites is symptomatic of a systemic limitation of composites, which is its strength anisotropism. Steel is grain-direction-free, having substantially the same strength in all directions. But composites, by their nature, have great strength in tension and compression in the fiber direction, with relatively little strength fiber-to-fiber across resin planes.

This problem can be largely overcome by running fibers in all major stress-experiencing directions. This is relatively easy to achieve with hand lay-ups In hand lay-ups it is relatively easy to achieve multi-directional fiber orientation. Strong and inexpensive woven roving fiber cloth, for example, can be laid-up by hand in any orientation to selectively allocate directional strength. Another multidirectional fiber fabric, the continuous strand mat, does not produce the same cross-strand strength as woven roving and is not as manageable when trying to in assigning strength to particular directions, but is nonetheless superior to the results achievable from unidirectional-only ply schedules.

Unfortunately, these bi-directional materials are almost exclusively used in the domain of one-by-one hand lay-up on a mold. True mass production of composites requires the pultrusion process, which is designed around and made possible by the tremendous tensile strength of fibers. It is difficult to use material other than unidirectional fiber cloth in pultrusions, although some cross-fiber cloth schedules using alternating layers of 0° and 90° cloth have been made to work. The tension on the longitudinal fibers can be tremendous, depending on the fiber mass and configuration and the relative size of the dye. Under such tension, materials which are easy to apply in a hand lay-up will fray or shred as they grind into the sides of the dye.

Even woven roving, so useful in hand lay-up, will pass through the die without hanging when used in complete sheets, because the lateral or woof fiber bundles loop back at the edges in a hem-like configuration. But as a practical matter, pultruded parts will not require entire widths only. At least one roll will have to be slit down to a portion of its whole width, resulting in a frayable edge of exposed woof fiber ends to hang up in the die and dispensing equipment and prevent the material from being properly pultruded. Heretofore no technique has been known for reliably pultruding this woven fabric, and the strongest pultrusions have therefore been made from continuous fiber mat material, or with alternating plies of unidirectional fabric. The great interlocked strength of woven roving has thus far eluded the pultruders.

The longitudinal shear strength of a notched test members made with these three varying ply arrangements, derived from actual tests, is as follows:

LONGITUDINAL SHEAR STRENGTH TESTS
ON A NOTCHED MEMBER (Empirical Data)

| PLIES USED | NOTCHED SHEAR STRENGTH, LBS/SQ. INCH |
|---|---|
| ▲ Continuous fiber | ▲ 3,000 |
| ▲ 90° alternating unidirectional | ▲ 5,000–6,000 |
| ▲ Woven Roving | ▲ 15,000 |

Clearly woven roving has a substantial edge in notched shear strength. How this manifests itself in notched structural members is demonstrated in the detailed description below, where it is easy to see how the strength of the fibers could be neutralized by relative weakness in the resin planes if the ply schedule is not very carefully controlled. No matter how careful the design, if only non-woven unidirectional fibers, or a combination of unidirectional and continuous strand plies are used, there will be weakness inherent in the resulting product along the inevitable smooth resin planes. If pultruded composites are to be truly liberated from the ax-handle, main-sail-stay, highway-delineator markets, especially for use as structural members, a way to introduce hi-directional woven material into the pultruded product is needed.

Adding woven materials to the mix minimizes resin plane weakness, but may not guarantee an adequate density of cross fibers where they are needed. An easily visualized example is a composite bolt or nut made from a blank formed by winding fiber cloth on a spindle, commonly done in small-diameter rod manufacturing. The resulting cylindrical billet from which the bolt will be milled and threaded, has no radial fibers, so the bolt threads will have no cross-fiber support at all from the bolt shaft. The same is true of the bolt head with respect to longitudinal shear forces. This will occur regardless of whether the cloth used in the winding process is woven or not. The great strength of the composite, which resides in the fibers, is completely absent at the very points that stress concentrates: the threads (and the shoulder, of a bolt). The nut and bolt may as well be made of resin without any fibers at all.

Thus the combination of a pultrusion made from interwoven fibers and a pultruded fabric orientation which causes laterally entrant machine cuts to sever fibers will be necessary to produce a truly machineable member that can be notched and cut to interlock at joints with virtually no disproportionate strength loss.

SUMMARY OF THE INVENTION

The instant invention achieves this next step in moving pultrusions into the mainstream, the latest in a series of steps toward engineering around shortcomings of the technology. The solution to the joint problem addressed in the parent patent and other patents referenced above avoided boring holes in the members by the use of interlocking machined notches and slots. In this manner the devastating impact on strength that bolt holes cause is avoided. But the root cause of the problem, namely the strength anisotropism of the medium, was designed around, rather than being addressed head-on and solved.

The inability of currently produced pultrusions to achieve the omni-directional strength characteristic that is so appealing in steel, is its major shortfall in structural applications. If pultruded members are to be machined, as they have to be to make practical structural members, a more directionally uniform fiber arrangement than is currently being pultruded is required. As discussed above, currently used 90-degree alternating uni-directional fabric layers will not provide the needed omni directional strength, and neither will continuous strand mats. Actual woven roving, with orthogonally extended arrays of interwoven fiber tows, must be used.

It is generally accepted that woven fabric cannot be pultruded if it has been slit longitudinally since the cut edge will be ragged and snag or otherwise foul up the equipment. As disclosed in more detail below, the inventors have the overcome this problem by using woven fabric, bonded to a unidirectional carrier in such a way that the frayed edge is captured by the carrier. The bidirectional material is packaged with the uni-directional carrier material such that the longitudinal fiber tows of the carrier overlay the terminated ends of the transverse bundles of the bi-directional material. The uni-directional material is stitched to the bi-directional, the stitch lines running longitudinally in the pultrusion direction and extending out to the unhemmed, slit edge or edges of the bi-directional material. This innovation eliminates the binding, fraying and miscellaneous hang-ups experienced in in prior attempts to pultrude woven roving.

Since machining pultruded members severs fibers and fiber direction and number determine strength, the lay of the plies relative to the overall configuration of the member can no longer be taken for granted, as made clear by the bolt example. An example even closer to home is a square, hollow beam of the type used in the transmission tower prototype and in most of the inventors' structures. When this beam is notched, as it must be, by lateral machine strokes, it will be weak if made from a single web of fiber fabric continuously wound on a mandrel as a square spiral web, which is one of the most common construction techniques. The notch will cut down through a certain number of layers and terminate at or near an interply surface, which is an uninterrupted resin shear plane, defining a natural fault line parallel to the surface. Longitudinal force applied to the beam at the notch will be met with little fiber reinforcement and the member will fail at a fraction of rated capacity, exactly parallel to the forces on the bolt threads. Use of woven fabric would not by itself produce the strength that is needed in heavy structural applications without beefing the beam up to the point of eroding strength-to-weight and price-to-strength ratios to commercially unacceptable levels.

To avoid termination of a notch at such a resin plane, which would be inevitable in the spiral wound model, a new method was developed whereby the woven roving is folded back and forth to form a stack of pleats prior to entering the resin bath and die. A pleat width of on the order of half an inch is used in the examples. The stacked pleats build up an entire layered wall with the layers running orthogonally to side to be cut. A cut into this wall, in contrast to terminating at or near a continuous resin surface, would cut across every crosswise ply there is in each pleat, leaving virtually no weakness caused by the anisotrophism of the medium. The beam has two of these walls on opposite sides.

DETAILED DESCRIPTION OF PREFERRED EMBODIMENTS

Figures 1, 2, 3:
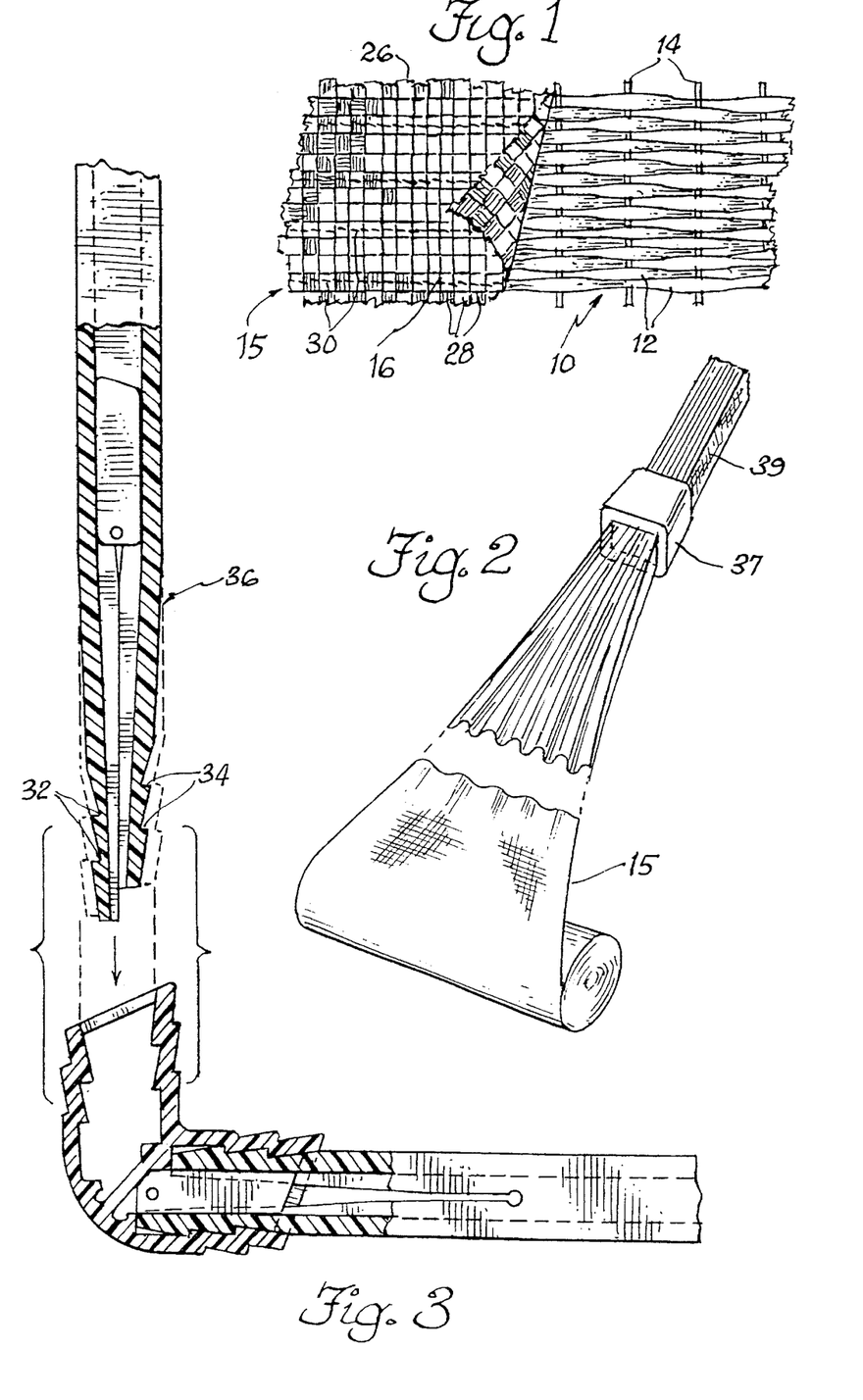
FIG. 1 is a top plan view of a layer of bi-directional glass fibers overlaid on a mono-directional fabric.
FIG. 2 is a diagrammatic illustration of the pleating process occurring in the pultrusion process as cloth is drawn from the roll of glass fiber fabric and folded into pleats to be compressed together into a wall in the end product.
FIG. 3 illustrates a finished product that incorporates the techniques shown in FIGS. 1 and 2, namely a beam with sawtooth detents which is captured in an opening in a post, both members being 100% composite.
Figure 4:
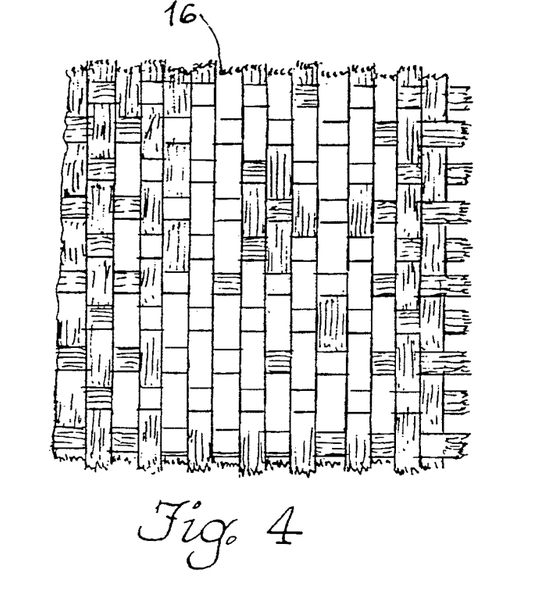
FIG. 4 is a top plan view showing the woven roving that is used in the pultrusion process in more detail.
Figure 5:
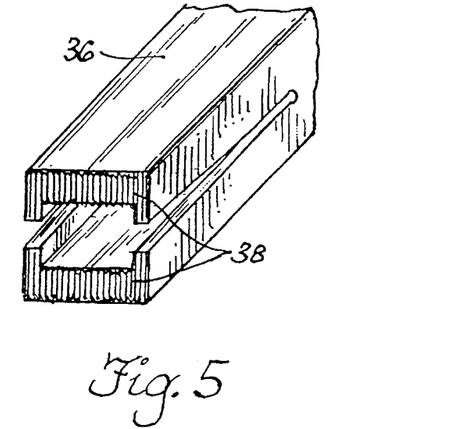
FIG. 5 is a perspective view of the end of a crossmember with pleated fabric side walls made from the technique illustrated in FIG. 2.

Fabric that is used in composites comes in a wide variety of configurations, two of which are shown in FIG. 1. A uni-directional cloth 10 has a series of fiber bundles 12, in this case glass fibers, sometimes referred to as "tows", which provide enormous tensile and compressive strength in the fiber direction. The bundles of fibers are roughly held in place by the spaced bands 14 which are incorporated into the fibers strictly to hold the bundles in place. These strands are made of a thermoplastic and have been heated and pressed into the fibers to hold them in place during the pultrusion process.

Atop the uni-directional fabric is a bi-directional fabric 16, which is exemplary of all bi-directional woven fabric insofar as this disclosure is concerned, but in fact is drawn from a sample of woven roving, which has bundles of fibers similar to the fibers of the uni-directional cloth 10 but running in both directions and being interwoven.

It is intuitive that in order to have a strong pultruded member, cloth must be used to incorporate fibers in roughly equal proportions running in cross-directions, as in the woven roving illustrated at 16. What is not so intuitive is the fact that the woven roving illustrated will not react to shear stress the same way that alternate Zero-degree and 90-degree fibers would react. A test was performed that illustrates the difference between these two configurations, although it was not the purpose of the test to so demonstrate.

The test was for the purpose of determining the strength of a cross-member having a machined notch 18 which was considered generic to different transverse machine cuts required to be made into the member for use in construction. The cross-member had been made with alternating layers of 0-degree and 90-degree cloth and was expected to be strong at the notch 18. It was anticipated by those running the test that the beam would fail somewhere along the notch cut lines 20 as in FIG. 8, at one of the opposite ends of the notch.

Figures 9, 10, 11, 12:
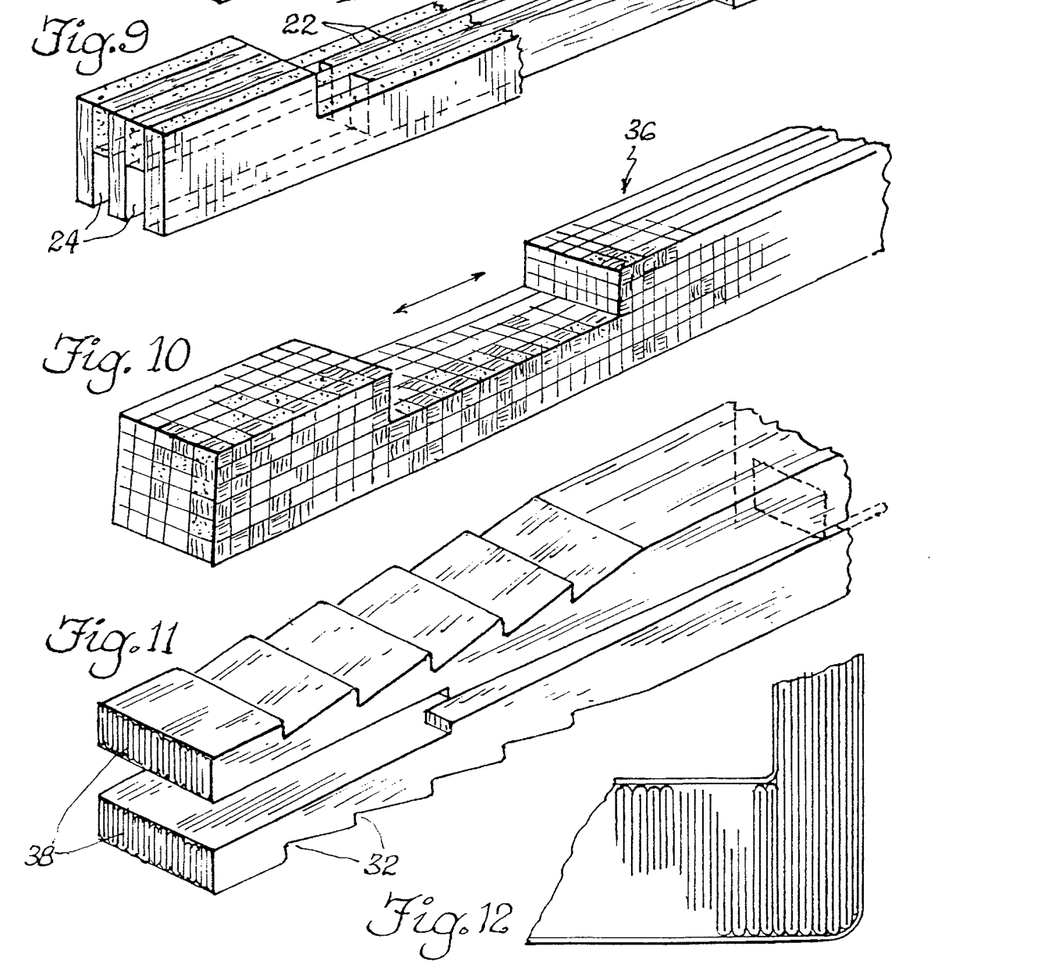
FIG. 9 is a perspective view of the specimen of FIG. 8 illustrating the results of the shear test on a prior art laminate.
FIG. 10 illustrates a beam made according to the new techniques disclosed herein as it appeared both before and after the shear test.
FIG. 11 is perspective view of the machined end of a cross-member made according to the pultruded woven fabric and pleated fabric sidewall build-up techniques disclosed herein; also illustrated in FIG. 3.
FIG. 12 is an enlarged fragmentary end view the of a cross-member of FIGS. 5 and 7 illustrating the pleats in more detail.

Totally unexpectedly, the beam separated as shown in FIG. 9. A glance of FIG. 9 does not readily reveal what happened. However, on analysis it was determined that the separation plane created by the tension stress placed on the beam was not the simple lateral plane that was expected, resulting in a break at one of the neck points with frayed broken fibers on either side. Instead, the fault plane followed a path that required that no fiber be broken at all!

In retrospect this is not so unlikely since the shear strength of the fibers is of approximately five times greater than the shear strength of the resin. It was easier for the part to separate along the long parallel fault planes 20 that passed only through resin zones, than to take a much shorter path which would require breaking a number of glass fibers. The interply planes indicated at 22 extended to the left end of the test specimen and the fault lines follow these all the way to the end. The continuous longitudinal fibers held, pulling out to the right along these resin planes, leaving the vertical-fiber cloth hanging from the upper portion of the remaining two-ply sandwich 24 on the left side, with the result that not a single fiber, in principle, would have had to be broken.

The result of this test was not good. Aside from the unusual configuration of the failed member, the strength was well below what was anticipated and below the shear strength required of this beam configuration. In order to make the beam fully functional, a way had to be developed to impossibilitate the fault plane tracking that occurred between FIG. 8 and FIG. 9.

Figure 8:
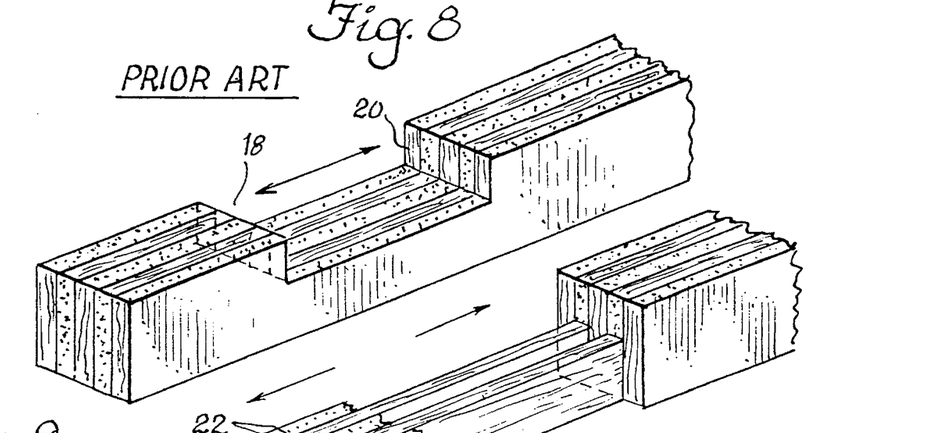
FIG. 8 is a perspective view of a test specimen of a prior art laminate tested for shear strength.

This could be done if the vertical fibers of FIGS. 8 and 9 were interwoven with the longitudinal fibers. In other words, rather than having 0-degree and 90-degree fibers provided in separate fabrics, the expedient of including them both in the same woven fabric would eliminate the problem represented in FIGS. 8 and 9. Although at first blush it might seem that there would still be resin fault lines between the planes of the cloth plies, there would be no failure such as the separation shown in FIG. 9, because each 0° fiber is interlocked with innumerable 90° fibers and vise-versa. No fiber group can simply be pulled out en masse from a slot between fibers running in the other direction as illustrated in FIG. 9.

The solution requires pultrusion of woven roving. But pultrusion efforts have not been notoriously successful when attempted with woven fabric.

Woven fabric will pull through the die if it is used in whole widths so that both side edges are doubled back hem-like and there are no open woof ends to fray. The warp strands cause no problem. But once the weave is slit, it will not pass through the resin bath and the die without the lose fiber ends of the cross-bundles fraying, hanging up trod causing major difficulties.

As a practical matter however, it is just not possible to use whole cloth widths all of the time. A pultrusion might require one whole roll and part of another roll, or two and a half rolls, etc., but there is bound to be at least one roll that must be slit in order to use only a fraction of its width. The alternatives to slitting rolls are, having specially made rolls, or specially designing the product to conform to available fiber cloth stock. These solutions are not practical.

Because the composite product is so strong and in most current composite applications is probably several times stronger than it need be, the failure of isotrophism because of the resin fault planes has not been addressed and in most quarters was not recognized. But when incorporating these fibers into large structural members requiring machined notches or holes, where the only considerations are high tensile, compressive and flexural strength, such matters, going to the heart of the threshold of failure of the part, become paramount and must be addressed and resolved. Woven material had to be treated or packaged such that it could be pultruded.

To accomplish this, the woven roving at 14 had to be worked in such a fashion that loose ends would not be free to hang up in the die. After considerable experimentation the successful technique that is disclosed herein was devised, whereby woven roving 16 is stitched to a uni-directional 0-degree carrier 14 to produce the combination cloth 15. In practice, stitching is done in stitch lines spaced across the entire widths of both ribbons of fabric, although conceivably in some implementations it would be possible to do otherwise provided that at least the loose edge or edges 26 of the woven fabric, defined by the unfinished woof toe fiber ends 28, were stitched.

As shown in FIG. 1, the stitch lines 30 are spaced to span several bundle of fibers, with the outermost being specifically included. This may not produce a perfectly smooth edge to the fabric, but it is well enough supported that serious problems are not encountered when the resulting cloth 15 it is pulled through the die.

As an alternative to the stitching, a thermoset plastic or other bonding agent could be used. The cross-members 14 of the uni-directional, which are not fibers but are a thermoset plastic, are such a material, and are heat-pressed to interstitially bond with the fibers of the uni-directional material. Likewise this composition could be used to bond the uni-directional to the bi-directional. What is of importance is that the open edge 26 of the bi-directional material have a substantially continuous bond to the corresponding edge of the uni-directional ribbon. This has to be done without making the resulting 3-ply cloth 16 too stiff to work into the appropriate configuration to pass through the die, so a thick or stiff thermoset plastic could not be used.

Solving the resin fault plane dilemma resolves only part of the problem. The notch that was cut into the members of FIGS. 8 and 9 was used to simulate the cross cutting notches 32 that make the convoluted teeth 34 of the insert beam 36 shown in FIG. 3. This is the configuration of the joints of the high voltage transmission tower and of other large structures that are being developed. Although different joints could be made it is very logical that any functional joint would require some milling into the material of the cross-member, or the main beam, because the pultrusion cannot be made other than uniform in cross-section without being machined. Therefore the test done in FIGS. 8 and 9 is generic to the problem of joint formation with pultruded composites and to all notched member solutions to the problem.

Figure 6:
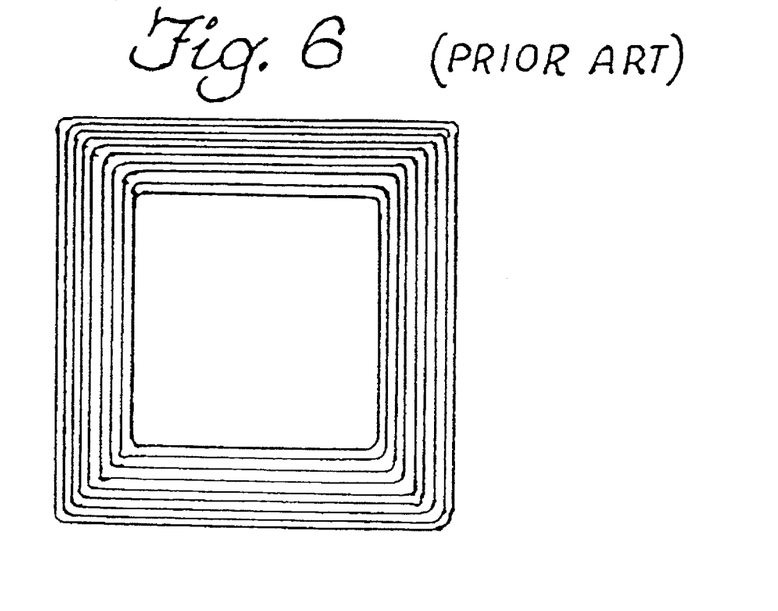
FIG. 6 is diagrammatic end view of a square-cross-sectioned prior art crossmember made according to the typical, conventional manner of winding composite layers to build up a beam.

A prior art wound-fabric cross-member is shown in FIG. 6. This is the obvious way to make a beam. This beam would have been pultruded on a square mandrel, or wound to dimension on the mandrel. This is the easy way.

Unfortunately, when made to this configuration it can be seen that any notch cut parallel to any surface of the beam will terminate along or near a resin plane, all of which are substantially parallel to the outer surfaces. If the sawtooth-surfaced end of the beam of FIG. 11 were made according to this construction, it is easy to envision the result. Referring to the very end of the bifurcated cross-member shown in FIG. 11 it can be seen that the teeth 34 would receive essentially no cross-fiber support if the construction were mandrel-wound. They would be easily sheared off, defeating their function as the supposed as the locking ends of support braces.

Two adjacent plies would merely shear along their mating surface with as little as a single cross-directional fiber layer opposing failure, depending on how deep the cut was made. Even made with woven fabric such that the smooth resin planes of the FIG. 8 model were not present, a shallow cut would require separation of only one or two lateral fiber layers if the beam was made by winding the material on a mandrel. The planes would be defined between the woven layers, and would not present such an easy separation as an alternating unidirectional schedule would, but in all likelihood, with a little tension the teeth would shear off of the member as it pulled out of the slot in the corner post with which it is intended to mate, shown in FIG. 3. It must be borne in mind that these members must handle high tension and compression loads, and are not designed with an abundance of unnecessary material to the extent that such weakness can be tolerated.

To eliminate this weakness, the beam 36 is produced as shown in FIGS. 10 and 11, providing no resin plane to shear. As can be seen from the end of FIG. 11, there is strength inherent in the vertical fibers, all of which must be sheared for the end tooth to be pulled free of the rest of the structure. There is so much cross-directional fiber material across all potential shear planes that it is unimaginable that the teeth would shear off responsive to anything short of a complete system failure in which the entire structure collapsed.

The beam walls are produced by feeding the previously manufactured combination cloth 16 from the roll through a pleating jig 37, thereby forming it into accurately folded layers of a stack 39 which is then processes through the resin bath and die into a dense wall 39. Two of these walls form the walls 38 of the box beam of the illustrated embodiment, as the entire beam pultrudes as a unit. One, two, three or four of the walls could be stacked pleats, or more for a beam having a higher degree polygon than the rectangle as a cross section.

Figure 7:
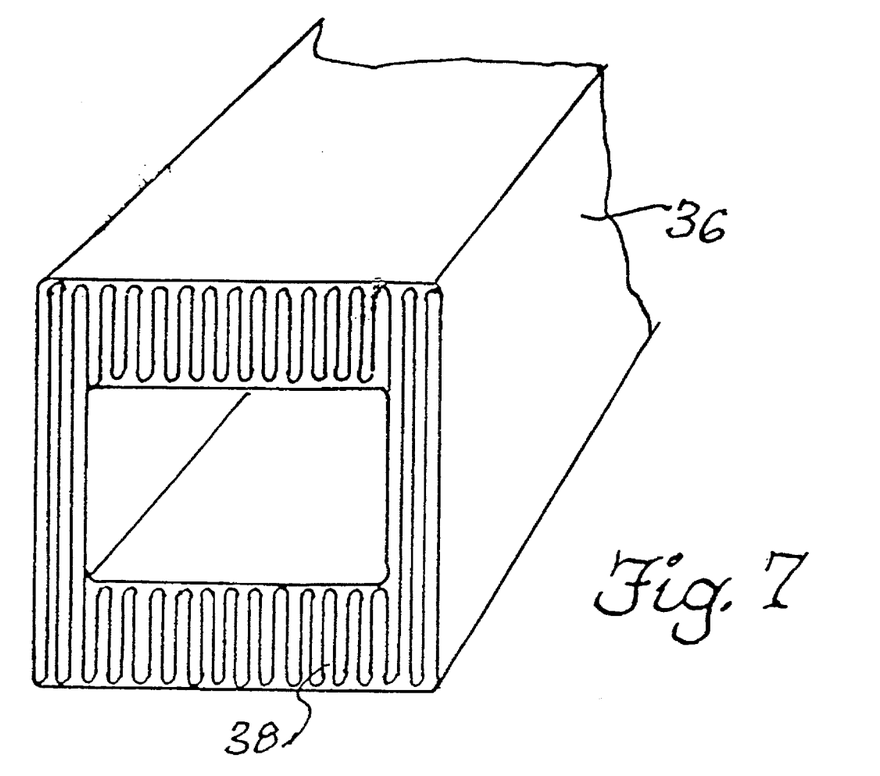
FIG. 7 is beam substantially like the beam of FIG. 5 before machining showing the stacked pleats made by the new technique.

The difference in strength between members fabricated according to the respective schemes of FIGS. 6 and 7, which have discontinuities resulting from notching or boring, is considerable. The teeth of the FIG. 11 beam would stand up to three- to five-times the shear force that an identical wound member could take. Notches and bores would always be made in the thicker pleated sides 38 where possible. Longitudinal loads, which the support members are designed to withstand, are resisted by substantial numbers of cross fibers no matter which way the notch is cut.

The pleated configuration requires considerably more engineering design than the mandrel-wound unit, but the payoff is a support that can be cut, bored or jointed at least with confidence, if not with the same carefree abandon as with steel. Since it is a rare beam or brace that is not cut in some way to form joints with other members, and as the ensuing weakening of the member has been the primary source of resistance to acceptance of composite structural members in the engineering community, the ability to produce a general purpose box beam without this drawback is significant.

Figure 13:
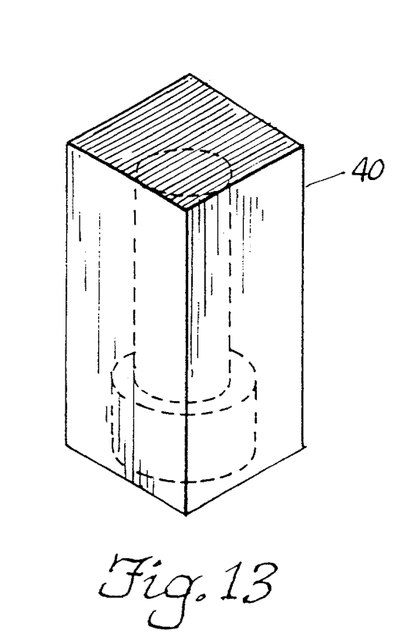
FIG. 13 is a perspective view of a billet made completely of pleated bidirectional woven roving.
Figures 14, 14A:
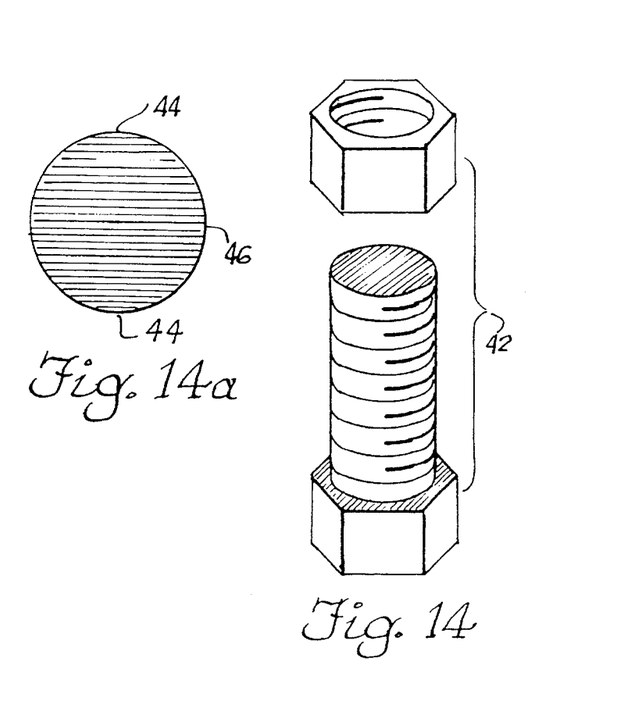
FIG. 14 illustrates a bolt made from the blank of FIG. 13.
FIG. 14a is a top plan view of the end of the bolt of FIG. 14 illustrating the fiber orientation.

Application of the pleated bidirectional woven roving fabrication technique is broad. A significant area is the nut-and-bolt, threaded fastener field. Composite bolts that are spiral-wound suffer greatly from the absence of radial fibers. Each thread is essentially on its own, being bonded to the body of the bolt only by resin. Since the threads, as well as the shoulder adjacent the head, bear the brunt of axial forces in most bolt installations this is an obvious problem. But a bolt and nut such as indicated at 42, made by turning and threading a blank having the form illustrated in FIG. 13 at 40 (or the equivalent cylindrical pultrusion) would have will have threads which vary sinusoidally in the extent of radial fiber support, from a minimum along the sides indicated at 44 to full support 90° around the surface at 46. Theoretically, all points along the threads will have some radial support from the radial components oft he transverse fibers (except for two dimensionless points at 44 and 180° from 44). Depending on the application, this improvement could easily make the difference between a bolt that works and one that lacks the rated strength to be designed into the construction.

The two thrusts of this invention move pultrusion technology closer to acceptance in structural fields. The machinability of beams made using both the woven roving and the pleated stack walls with edge-on layers is bound to impress engineers in the field who have previously lost interest due to the anisotropism problem. The capability of machining members without major strength loss disproportionate to the material removed, coupled with the ability to create joints at virtually any angle with the ease of a right angle, the ability to interlock with no fasteners or adhesives, on top of all of the materials characteristics unique to composites moves the composite structural member ever closer to parity with conventional steel or wood members in many structural applications.

We claim:

1. A pultrusion of enhanced isotropic strength characteristics comprising:
    (a) a fiber component defining a longitudinal pultrusion direction and being comprised of:
        (I) at least one layer of bidirectional woven roving fiber cloth having
            (a) an array of transverse woof fiber tows and having at least one unfinished side edge defined at least in part by exposed fiber ends of fibers of said transverse fiber tows;
            (b) an array of longitudinally extended warp fiber tows interwoven with said woof fiber tows;
        (ii) a longitudinally extended binder layer superimposed on said layer of woven roving at least over a portion thereof adjacent said at least one unfinished side edge;
        (iii) said binder layer binding said exposed ends of fibers of said transverse fiber tows and matting same to minimize the exposure of frayed ends; and,
    (b) a solidified resin matrix impregnated into said fiber component to define a rigid mass having bidirectional interwoven fibers at least a portion of which has been pultruded into multiple continuous layers of bidirectional fiber cloth in a switchback pleat configuration with pleat fold lines parallel to the pultrusion direction and at least some of the fibers of said fiber cloth having substantial transverse directional components to define cross fibers such that machine cuts made into said pultrusion in a direction substantially parallel to said cross fibers are reinforced by same against longitudinal shearing forces.

2. A pultrusion according to claim 1 wherein said binder layer is also a carrier and comprises a second layer of longitudinally extended fiber cloth comprising unidirectional longitudinally oriented fibers.

3. A pultrusion according to claim 2 wherein said second layer comprises unidirectional roving and is stitched to said woven roving at least along said at least one unfinished edge.

4. A pultrusion according to claim 1 wherein said pultrusion defines at least one machine cut through at least one of said multiple contiguous layers terminating substantially coincident with an interstitial plane between adjacent ones of said multiple layers, whereby structure remaining alongside said cut after machining defines no un-reinforced smooth fault planes through to the periphery of said pultrusion.

5. A pultrusion according to claim 1 wherein said pultrusion is a beam having sawtooth-shaped detent structure machined into at least one side of at least one end thereof to define spaced laterally extended teeth and notches between adjacent teeth of said detent structure and said woven roving layers substantially define planes substantially parallel with the direction of extent of said teeth and the longitudinal direction such that the roving in one direction of said bidirectional woven roving cloth comprise transverse cross-fibers paralleling the teeth such that said teeth are fully reinforced with cross-fibers against longitudinal shear forces caused by longitudinal stresses on said teeth.

6. A pultrusion according to claim 1 wherein said pultrusion is a beam defined substantially in its entirety by said multiple layers of said fiber component and at least a portion of said beam is built up in said switchback pleat configuration such that said beam is machine-ready at least along said portion thereof in that any lateral notches or bores transversely cut into said portion will leave sidewalls reinforced by cross-fibers.

7. A pultrusion according to claim 6 wherein said beam is a hollow box beam rectangular in cross section and said at least a portion of said beam comprises two opposite sidewalls thereof which are designated as the machinable sidewalls, and the switch-back pleats thereof are folded back and forth in the lateral direction to define longitudinally extended creases, and said pleats are oriented orthogonally to the exterior surface of the respective wall such that cuts into the machinable sidewalls cut edge-wise into the switchback pleats.

8. A pultrusion according to claim 6 wherein said at least a portion of a beam substantially comprises said beam in its entirety such that said switchback pleats are transversely extended relative to the pultrusion direction to define a solid pultruded beam having two longitudinally extended fiber arrays from said unidirectional and bidirectional fiber cloths, respectively, and a laterally extended array from said bidirectional fiber cloth, such that said solid pultruded beam is machinable throughout its length with inherent reinforcing strength for machined cuts increasing as said cuts are made increasingly parallel with the fibers of said laterally extended array.

9. A pultrusion according to claim 8 wherein said beam is a cut-off length at least a portion which is turned on a lathe to define a cylindrical blank at least a portion of which is machined to define a helical thread converting said portion of said cylindrical blank into a threaded shaft.

10. A pultrusion according to claim 9 wherein said beam comprises a bolt defined by a head of substantially unaltered pultruded cross section and said threaded shaft, which is contiguous with said head.

11. A composite pultrusion comprising:
I. a fiber cloth composite component comprising:
   (a) a bidirectional fiber fabric comprising:
      (I) a first array of spaced substantially parallel fiber bundles;
      (ii) a second array of spaced substantially parallel fiber bundles extending substantially transversely of the bundles of said first array;
      (iii) the bundles of said first array being interwoven with the bundles said second array such that substantially all of the fibers of each array are interwoven with the fibers of the other array to define an interlocked fiber grid;
      (iv) said bidirectional fabric being substantially continuous in a direction defined as the pultrusion direction and having a transverse direction substantially orthogonal to said pultrusion direction and a discrete width dimension measured in said transverse direction such that said bidirectional fabric defines two generally parallel side edges and is manifested as an elongated bidirectional fiber ribbon;
   (b) a unidirectional fiber fabric defined as a unidirectional fiber ribbon of longitudinally extended spaced fiber bundles and substantially parallel side edges;
   (c) said unidirectional fiber ribbon being overlaid onto said bidirectional fiber ribbon such that at least one of the edges of each ribbon is an aligned edge which is substantially aligned with an edge of the other of said ribbons;
   (d) positive attachment means attaching said ribbons together substantially continuously at least along a region substantially adjacent said aligned edges such that the aligned edge of said unidirectional fiber ribbon stabilizes said transverse bundles of said second array of said bidirectional ribbon against fraying;
   (e) at least a portion said bidirectional fiber fabric being configured at least in part as multiple continuous layers of bidirectional fiber cloth laid out in a switchback pleat configuration with pleat fold lines parallel to the pultrusion direction and at least some of the fibers of said fiber cloth having substantial transverse directional components to define cross fibers such that machine cuts made into said pultrusion in a direction substantially parallel to said cross fibers are reinforced by same against longitudinal shearing forces and, II a resin matrix integrated into the fibers of both said unidirectional fiber ribbon and said bidirectional fiber ribbon by being drawn through a die with both said ribbons and allowed to cure to produce a solid high shear strength composite mass.

12. A composite pultrusion defined at least in part by multiple contiguous layers of bidirectional fiber cloth in a switchback pleat configuration with pleat fold lines parallel to the pultrusion direction and at least some of the fibers of said fiber cloth having substantial transverse directional components to define cross fibers such that machine cuts made into said pultrusion in a direction substantially parallel to said cross fibers arc reinforced by same against longitudinal shearing forces.

13. A pultrusion according to claim 12 wherein said bidirectional cloth is woven roving having 0° fibers, and 90° fibers defining said cross fibers.

14. A pultrusion according to claim 13 wherein said pultrusion is a first pultrusion and defines at least one re-entrant structural notch in a side thereof, said at least one notch having a direction of entrance into said beam substantially parallel to the direction of extent of said 0° cross fibers and said notch being configured to interlock with a second pultrusion.

15. A pultrusion according to claim 14 wherein said first and second pultrusions are structural members said first pultrusion has one end which is bifurcated defining a bifurcation slot and resilient tines, with oppositely directed sawtooth arrays machined into the outer surfaces of said tines, said sawtooth arrays being compressible into said bifurcation slot, and said second pultrusion has a detent opening to receive said tines when compressed, and lock onto them when released.

* * * * *

UNITED STATES PATENT AND TRADEMARK OFFICE
CERTIFICATE OF CORRECTION

PATENT NO. : 5,597,629
DATED : Jan. 28, 1997
INVENTOR(S) : Johnson et al.

It is certified that error appears in the above-indentified patent and that said Letters Patent is hereby corrected as shown below:

Title page, item [19], reading "Johnson" should read --Johnson et al.--.
Title page, item [75], reading "Inventor: David W. Johnson, San Diego, Calif."
should read --Inventors: David W. Johnson, 1884 Sunset Blvd., San Diego,
W. Brandt Goldsworthy, Palos Verdes Estates, George Korzeniowski, Sherman
Oaks, all of Calif. 91403--.

Signed and Sealed this

Fifteenth Day of April, 1997

Attest:

BRUCE LEHMAN

Attesting Officer    Commissioner of Patents and Trademarks